INVENTOR.
M.O. KILPATRICK
BY Hudson and Young
ATTORNEYS

Patented Feb. 12, 1952

2,585,659

UNITED STATES PATENT OFFICE 2,585,659

RECOVERY OF CARBON BLACK FROM SUSPENSION IN A GAS

Myron O. Kilpatrick, Bartlesville, Okla., assignor to Phillips Petroleum Company, a corporation of Delaware Application March 25, 1946, Serial No. 656,964

24 Claims. (Cl. 23—209.8)

This invention relates to the recovery of carbon black from suspension in a gas and more particularly to a process for the recovery of carbon black from the effluent (known in the art as "smoke") of a furnace type reactor chamber which is employed for making the type of carbon black known as furnace black. Still more particularly it relates to a process of the foregoing type which accomplishes removal of the carbon black as a slurry in an aqueous liquid medium.

In the process for making carbon black by the furnace type method, a liquid or gaseous hydrocarbon is fed into a reactor, or combustion chamber, along with a controlled quantity of air. The product off one of these reactors contains large quantities of gases (hydrogen, water vapor, carbon dioxide, etc.) and solid particles of carbon black. This stream leaves the reactor between 2000° F. and 3000° F. and is usually cooled immediately to between 1000° F. and 1500° F. by a water quench. In the conventional recovery process the carbon black containing stream is further cooled in a secondary quench to between 300° F. and 600° F. before entering a Cottrell precipitator where the carbon black is retained and/or agglomerated by the electrodes of the precipitator.

The principal objects of the present invention include the following: (1) To provide an improved method of recovering carbon black from suspension in a gas; (2) To provide an improved method of recovering carbon black from combustion products of a carbon black furnace; (3) To provide an improved method of recovering furnace carbon black from smoke; (4) To reduce or eliminate the need for using expensive Cottrell precipitators or unsatisfactory filters; (5) To provide a process whereby the carbon black is recovered as a slurry in an aqueous liquid medium; (6) to recover the carbon black as a slurry in water; (7) To recover the carbon black as a slurry in rubber latex; and (8) To form a concentrated slurry of the carbon black. Numerous other objects will hereinafter appear.

Figure 1:
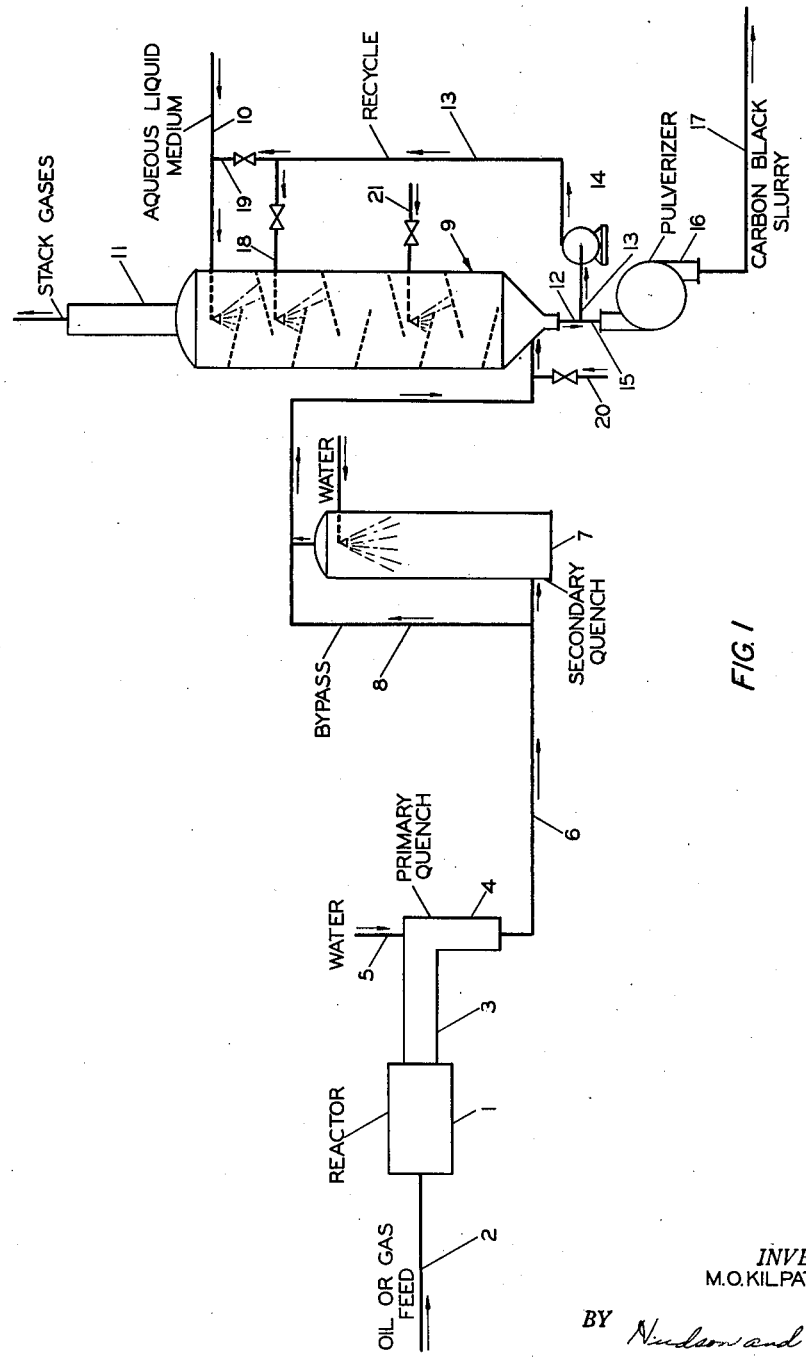

In the accompanying drawings:

Fig. 1 portrays diagrammatically one arrangement of equipment which is very satisfactory for carrying out my invention as applied to the recovery of furnace black.

Figure 2:
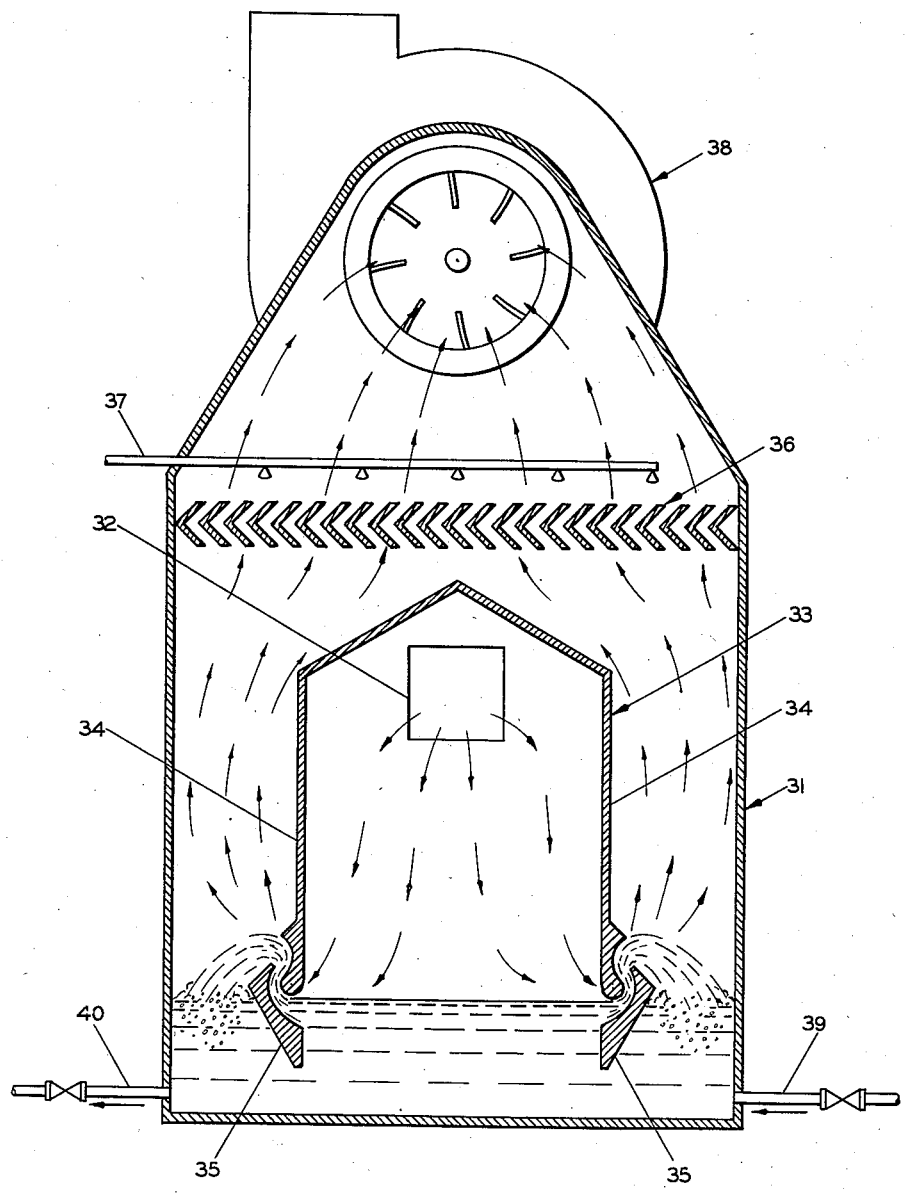

Fig. 2 portrays a modification of the scrubbing equipment of Fig. 1 which may be employed in recovery of furnace black by means of rubber latex.

In accordance with my invention carbon black is recovered from suspension in a gas by intimately contacting the gas with an aqueous liquid medium. This contacting is carried out under such conditions that the carbon black particles are wetted by the aqueous liquid medium and caused to leave the gas and become suspended, forming an aqueous carbon black slurry.

My invention is applicable to any suspension of carbon black in a gaseous medium, whether said suspension be the effluent from a carbon black producing process or whether said suspension be formed from previously produced carbon black by suspending same in a gaseous stream. For example, it is old to unload dry unpelleted carbon black from tank cars by sucking same into a stream of gas, such as air, using equipment known as a pneumatic conveyor. This causes the formation of a suspension of the carbon black in the gas. My invention may be employed to separate the carbon black from such a suspension.

My invention is especially applicable in the recovery of carbon black from the combustion products or "smoke" issuing from a unit making furnace black. As is well known, furnace black is made by subjecting a suitable hydrocarbon fluid such as gas oil or natural gas to incomplete combustion in the presence of a limited amount of oxygen. Usually a secondary stream of hydrocarbon fuel and air is charged to the furnace to bring about the desired reaction. Examples of production of furnace black are given in U. S. Patents to Krejci 2,375,795 and 2,375,796.

The concentration of carbon black in the smoke stream issuing from a furnace type reactor such as that disclosed in the Krejci patents just mentioned averages about 39 grains per standard cubic foot dry. This is an extremely small amount of suspended carbon black on a weight or volume basis. This illustrates the magnitude of the problem which confronted applicant.

Any suitable aqueous liquid may be used as the scrubbing medium employed in practicing my invention. The particular aqueous medium selected will depend, of course, upon the type of slurry desired. Water is often preferred. Water gives a carbon black-water slurry which can be used very successfully in copolymerization plants for incorporation in synthetic rubber latex just prior to coagulation. For example, by erecting a furnace type carbon black plant adjacent to or in conjunction with a copolymerization plant and employing my invention, the carbon black can be recovered from the furnace gases by means of water, thereby eliminating very expensive Cottrell precipitators and complicated carbon black densing and pelleting. The resulting water slurry can be pumped directly into the rubber plant. In this way great savings can be effected.

Instead of water, I may use rubber latex as the liquid medium for recovery of the carbon black from suspension in the gas. This is disclosed in detail hereinafter.

Transportation and handling of carbon black is very inconvenient and troublesome. In conventional practice the carbon black is recovered by an electrical precipitator, then densed, then pelleted, finally packaged, and shipped to the destination. My invention eliminates all of these steps. It is obviously much simpler and cheaper to transport the fuel, such as gas or oil, to the destination and there convert it into carbon black slurry in accordance with my invention than making the carbon black at one point and shipping it to the point where it is to be used.

Where water is used for forming the slurry, it is preferable that it be hot inasmuch as the black is more readily wetted by hot water. The temperature of the water is preferably at least 140° F., ranging upwardly therefrom to the boiling point. The nearer the temperature is to the boiling point of the water, the better is the wetting, the more easily is the slurry formed, and the more complete is the removal of the carbon black from the gas.

In most cases the water should be treated in any suitable manner to free it from objectionable or harmful compounds. For example, deionized water may be used. Use of treated water is advantageous since it eliminates objectionable effects during the slurry formation and during mixing of the resulting slurry with rubber latex. If untreated water is employed, calcium and magnesium soaps are formed when the slurry is commingled with the latex. Latex generally contains water-soluble soaps. These soaps react with the calcium and magnesium in the slurry made with untreated water to form insoluble soaps which are highly undesirable.

I generally prefer to add to the water or other aqueous liquid scrubbing medium a wetting agent which promotes the wetting of the carbon black by the water or other medium. This agent may also function as a dispersing agent for the carbon, holding the carbon black in suspension in the aqueous medium.

Any suitable wetting agent may be used. The preferred wetting agent is "Daxad-11," a commercial material manufactured by Dewey and Almy Chemical Company. This material may be defined as a polymerized sodium salt of alkyl-naphthalene sulfonic acid (wherein the alkyl group is a short chain such as isopropyl). In terms of electrolytic dissociation this compound may be classified as an anionic surface active agent. Members of the nonionic class may also be used. An example is "Triton NE" which is an organic alkyl polyether alcohol. Surface active agents in the cationic class are not preferred. Other suitable organic wetting agents are sulfonated alkylated benzene or other sulfonated alkylated monocylic aromatic or naphthalene and the alkali metal salts thereof, made, for example, by condensing benzene with chlorinated kerosene in the presence of a Friedel-Crafts catalyst, such as AlCl₃, or by alkylating aromatics in any other suitable manner, and sulfonating the resulting alkylated aromatic on the ring.

Instead of the wetting agents set forth in the preceding paragraph, I may use other materials such as soaps (water-soluble soaps such as the alkali metal salts of long-chain fatty acids) or certain bark extracts such as those known as saponin. However, the bark extracts like saponin are generally unsatisfactory because they show an extreme foaming tendency. Unless some means is employed to allay this tendency, saponin cannot be used in many cases.

I prefer to use those wetting agents which show little or no foaming tendency.

In many cases, especially where the smoke stream is at a temperature of from 300 to 600° F. or higher when it contacts the aqueous slurry-forming medium, I find it highly desirable to use an anti-foaming agent. For example, the anti-foaming agents disclosed in Craig U. S. Patent 2,362,052, may be employed. Any other suitable means known to the art or hereafter discovered for suppressing foaming of the aqueous liquid medium may be employed. Use of an anti-foaming agent may be imperative when certain wetting agents are employed.

The amount of the wetting or dispersing agent employed may vary within wide limits, for example, from 0 to 5 per cent by weight based on the carbon black ultimately suspended in the slurry. A preferred range is from 2 to 3 per cent by weight based on the weight of black. It should be emphasized that these figures refer to the weight of black only. For example, in a 25 per cent slurry with 3 per cent of wetting agent, there would be 0.75 per cent of the wetting agent in the composite slurry.

Not every type of carbon black requires a wetting agent. Certain types of carbon black are known which will actually sizzle when contacted with water and thus no wetting agent is required in such cases to produce a slurry.

I have found that once a slurry is started, that is, as soon as some quantity of carbon black has been thoroughly wetted, that additional quantities of black are readily dissolved or wetted by the slurry. In fact, with furnace black of the type known as "Philblack" produced in accordance with Krejci U. S. Patent 2,375,796, a slurry formed with water and a wetting agent will literally suck additional quantities of carbon black into the slurry.

This discovery may be taken advantage of in accordance with a preferred embodiment of my invention. Thus, the aqueous carbon black slurry may be withdrawn from the contacting zone, for example, from the bottom of a vertical scrubing zone, and split into two streams, one a product slurry stream and the other a recycle stream. This recycle stream may be pumped back into the contacting zone for further contact in accordance with the discovery that once slurrying has been initiated, additional slurrying is very rapid.

Recycling of slurry in the manner just described, for additional slurrying enables a higher concentration of carbon black in the product slurry to be attained. In this way the carbon black may be caused to attain a level of from 10 to 25 per cent by weight of the slurry, in a simple and economical manner.

Generally the recycle stream of slurry substantially predominates over the product stream. In many cases the recycle stream may constitute as much as 90 per cent and the product stream as little as 10 per cent of the slurry stream withdrawn from the contacting zone. In any event, I prefer that the recycled slurry stream be at least 5 times as great as the product slurry stream.

When a vertical countercurrent contactor is employed, I may inject the recycled slurry stream into the scrubbing zone at a point intermediate the points of introduction of the fresh aqueous liquid and the incoming smoke. I may introduce the recycled slurry at a point adjacent the top of the scrubber but substantially below the point at which the fresh medium is introduced. In this way the outgoing gas is finally scrubbed with fresh liquid.

It may be preferable to recycle the slurry into admixture with the fresh incoming aqueous liquid, thereby obtaining the advantage of more rapid slurrying by reason of slurrying having been initiated. In this way I may take advantage of the discovery, mentioned above, that transfer of carbon black from gaseous suspension to a preformed slurry, even though it may have a low carbon black concentration, is much more rapid than transfer to an aqueous medium containing no carbon black slurried therein.

In many cases it may be preferred to divide the recycled slurry stream into two portions, the major portion being introduced into the scrubbing zone at a point substantially below the point of introduction of the fresh aqueous medium, and the minor portion being admixed intimately with said fresh medium prior to introduction thereof into the top of the scrubbing zone. In this way the advantages of having a high carbon black concentration in the lower part of the scrubbing zone and of having a low but substantial carbon black concentration in the aqueous medium which contacts the gases leaving the scrubber are attained.

It will be obvious that the product slurry stream is withdrawn from the system at a rate corresponding to that at which fresh aqueous medium is introduced to the contacting zone. This is true regardless of the magnitude of the carbon black concentration maintained in the slurry in the endless cycle or recirculating system and regardless of whether the recycled slurry stream is admixed with the incoming fresh aqueous medium or is introduced into the contactor at a point below the incoming fresh medium.

It will also be obvious that while the carbon black concentration of the slurry that is recycled is identical with that of the product slurry stream, yet a steady state condition is established and maintained whereby the carbon black concentration gradually increases as the slurry moves downwardly through the contact zone.

It is preferred to form a slurry having a carbon black concentration in excess of 10 per cent. The higher this figure, the less the cost of handling and transportation, the less the dilution when the slurry is mixed with rubber latex, and the less the expense of water removal at the rubber plant.

In order to form slurry concentrations in excess of 10 per cent, a wetting or dispersing agent is practically essential in order to maintain a pumpable slurry. When hot water only it used, the slurry begins to have a body at approximately 7 to 8 per cent concentration and the viscosity of this slurry increases rapidly at a concentration of 10 per cent. If viscosity is plotted as the ordinate against concentration as the abscissa, the curve breaks from a horizontal to an almost vertical plane at 10 per cent. By the use of approximately 3 per cent of wetting agent (based on the ultimate weight of carbon black of 25 per cent) in the water, however, the viscosity of the slurry may be maintained at a low value and practically constant until a concentration of about 25 per cent is obtained. At this point the condition just noted for 10 per cent slurry with no wetting agent repeats itself. The preferred concentration of carbon black in the product slurry, when a wetting agent is used, is 15 to 25 per cent. When water without a wetting agent is employed, the preferred ultimate carbon black concentration in the slurry is 8 to 10 per cent. All concentrations given in this specification are by weight.

It will be seen that the wetting or dispersing agent serves two very important purposes, at least with respect to most carbon blacks. The first purpose is to increase actual efficiency of wetting the black, and the second purpose is to effect viscosity control of the slurry. As pointed out above, all blacks do not require such agents for wetting only, but all blacks do require such agents for keeping slurry viscosity low provided the 10 per cent concentration figure is exceeded.

In applying my invention to the recovery of carbon black from the smoke issuing from a furnace type of reactor, I apply the conventional primary quenching with water to the hot gaseous effluent leaving the reactor at 2000 to 3000° F., using an amount of water such that its temperature is reduced to between 1000 and 1500° F. The water used for this quenching is entirely vaporized. The resulting carbon black stream may be given a further or secondary quenching to a temperature of 300 to 600° F. and may then enter the scrubbing step. Where water is used as the scrubbing agent, the temperature of the gases fed to the scrubber is relatively immaterial and may range from 300 to 1500° F.

Where rubber latex is used instead of water as the liquid contacting medium, there may be danger of coagulation of the latex within the contacting equipment, especially at high temperatures. When latex is used, I prefer to employ a secondary quenching to a temperature below 300° F. with water as the quenching medium. To avoid coagulation of the latex it may be desirable to lower the temperature of the smoke stream to as low as 100° F. A temperature of from 100° F. to 250° F. is preferred. The quenching of the smoke stream with water to a temperature within this range is difficult because in so doing a liquid water phase is formed in the quenching operation with the result that the quenching equipment and immediate lines become plugged or mudded up with partially wetted carbon black. It is impossible to attain this degree of quenching without direct contact with water and the resulting liquid phase. In order to overcome this difficulty I prefer, when using latex as the slurry-forming medium, to carry out the secondary quenching step, or at least that portion of the quenching which lowers the temperature of the smoke below the boiling point of water, in the base of the latex contacting equipment. I may do this by injecting liquid water, containing a wetting agent or not, into the smoke just before it enters the bottom of the contactor and may inject liquid water at a point substantially above the point of entry of the smoke. The water so introduced may or may not contain a wetting agent, and may or may not be commingled with a small amount of recycled slurry in order to promote wetting of the carbon black and removal from the gas. The liquid latex descends through the zone and merges with and picks up the water-carbon black mixture formed in the secondary quenching zone. The resulting latex-carbon black slurry is somewhat diluted by the water, but I am careful to limit the amount of water introduced so that dilution of the slurry is not excessive. And by appropriately recycling slurry as explained above I can attain the desired high carbon black concentration even though the slurry necessarily contains less rubber in relation to water than it would were no water introduced. However, this objection is outweighed by the fact that this type of operation enables me to obtain directly a slurry of carbon black in latex without coagulating or otherwise injuring the latex and without plugging of secondary quenching equipment.

As in the case of water, I may recycle a major portion of the slurry in latex withdrawn from the bottom of the scrubber. This may be recycled entirely into the scrubber at a point substantially below the top thereof. Or it may be recycled entirely into admixture with the latex fed into the top. As before, however, I often prefer to introduce a major proportion of the recycle stream into the upper portion below the fresh latex and a minor proportion thereof into admixture with the fresh latex introduced at the top.

The rubber latex may be either natural or synthetic. The use of synthetic rubber latex in practicing my invention is especially advantageous. By locating the carbon black furnace in juxtaposition to a rubber copolymer plant, the synthetic latex may be pumped from rubber plant to the carbon black plant and there employed to recover the carbon black, the resulting slurry of carbon black being pumped back to the rubber plant for coagulation and further processing in the usual manner.

The rubber latex may already contain a wetting agent. For example, in the emulsion polymerization process of making synthetic rubber, it is necessary to use an emulsifying agent for emulsifying the monomeric materials in the aqueous phase. Examples of materials which have been employed in the production of synthetic rubbers are the well-known soaps, such as sodium oleate, sodium stearate, etc.; and the well-known wetting agents, such as sulfonated mineral oils, organic sulfonic acids, saponin, etc. The emulsifying agent which was adapted as standard in the GR-S rubber program was pure water soluble soap.

The wetting agent already present in the rubber latex may serve as the wetting agent for facilitating for wetting with the carbon black with the latex in practicing my invention. Alternatively, an extraneous or additional wetting agent, such as those described in detail in the early portion of this specification, may be introduced into the rubber latex before it is employed to recover carbon black from suspension in a gas in accordance with the present invention.

In order to effect intimate contact between the carbon black-laden gas stream and the aqueous liquid scrubbing medium, any suitable equipment may be used. In some cases a vertical contacting tower is employed, the aqueous liquid medium being introduced at the top and the smoke being injected into the bottom. This tower is preferably provided with baffles or other suitable contacting means. The carbon black-laden gas passes upwardly in countercurrent to the aqueous scrubbing medium. Instead of baffles, packing may be employed for promoting intimate contact between gas and liquid.

In some cases, it may be preferred to employ concurrent contact of the carbon black-laden gas and the aqueous liquid medium. This is especially desirable when equipment such as that known in industry as a "Roto-Clone" is employed. This eliminates the necessity of pumping the recycled slurry to achieve the desired concentration, since the "Roto-Clone" gives the final concentration in a once-through operation.

Instead of the contacting equipment described above, mechanical washers of any known type for scrubbing very small dispersoids from a gas stream may be employed.

The gaseous effluent from the contacting chamber may be passed through a Cottrell precipitator, bag filter, or any other suitable device for removing last traces of carbon black.

The carbon black slurry made by my invention is preferably passed through a wet grinder or pulverizer in order to produce a more uniform particle size carbon black and a slurry which is smooth and free from graininess.

In Fig. 1 of the drawings, the oil or gas to be converted into furnace carbon black enters reactor 1 via line 2. Reactor 1 is shown schematically only. It will be understood that fuel and air must be introduced to reactor 1 in order to provide the necessary heat for decomposition. It will also be understood that the oil or gas feed flowing in line 2 is subjected to limited combustion with a controlled amount of air and thereby converted to carbon black in the known manner. The reaction gases containing the carbon black in suspension leave through the header 3 and are subjected to primary quenching in portion 4 by means of liquid water injected via line 5. The resulting gaseous stream which is now at a temperature of from 1000 to 1500° F. passes via line 6 either to separate secondary quenching means 7, or via bypass line 8 directly into the bottom of contacting chamber 9. If secondary quench tank 7 is not employed, I prefer to carry out secondary quenching in the bottom of unit 9, especially in the case where latex is used as the scrubbing medium instead of water.

Unit 9 is a vertical contacting tower equipment with the usual sloping baffles to promote intimate contact between the ascending gas and the descending aqueous scrubbing medium. The scrubbing medium is introduced via line 10 to the top of unit 9. The scrubbed gases leave via header 11 whence they are passed to a Cottrell precipitator, a bag filter, or to the air.

As the aqueous scrubbing medium descends in unit 9, it wets the carbon black particles suspended in the gas thereby causing them to leave the gas and become suspended in the aqueous liquid, forming an aqueous carbon black slurry. This slurry leaves the bottom of unit 9 via line 12. I prefer to split this stream into two portions, the major portion being recycled to unit 9 via line 13 and pump 14, and a minor portion being withdrawn via line 15. The portion flowing in line 15 constitutes the product of my process. I prefer to pass it through wet pulverizer 16 in order to grind any coarse particles to a fine state of subdivision and remove any graininess, thereby giving a smooth, uniform slurry which is withdrawn via line 17.

The recycled slurry may be entirely reintroduced into the contactor 9 via line 18. Alternatively, it may be entirely passed via line 19 into admixture with the incoming aqueous liquid medium flowing in line 10. I prefer, however, to introduce a major portion of the recycled slurry via line 18 and to admix a minor portion thereof with the fresh aqueous medium continuously entering the system via line 10. Any means such as a conventional mixing T may be employed to effect intimate and homogeneous admixture of the slurry introduced via line 19 with the fresh liquid flowing in line 10 prior to introduction of the mixture into unit 9.

When latex is employed as the scrubbing medium, it is desirable that a secondary quenching be employed in order to reduce the temperature of the gases contacting the latex to a suitable low temperature. While this secondary quench may be carried out with liquid water introduced into secondary quench tank 7, I much prefer to dispense with tank 7 and to inject the relatively hot smoke directly into the bottom of unit 9, the secondary quenching being carried out in the lower portion of unit 9. Liquid water is preferably introduced via line 20 directly into the smoke stream just prior to its entry into unit 9. Liquid water is also introduced via line 21 into unit 9 at a point substantially above the bottom thereof. In this way the smoke stream is secondarily quenched to a relatively low temperature, say 250° F., before it enters the portion of unit 9 above the point of entry of pipe 21. In order to initiate wetting by the water injected in line 21, a small portion of the recycle slurry stream may be intimately admixed therewith prior to introduction into unit 9. By proceeding in the manner just described, any tendency to plug in the secondary quenching section of the equipment is eliminated since the downwardly descending latex wets and washes out any partially wetted carbon black and incorporates same into the latex slurry issuing via line 12.

In the unit shown in Fig. 2 of the drawing, a closed chamber 31 which is square or rectangular in horizontal cross-section is provided. The smoke enters through opening 32 at the rear of the unit near the top of a fixed guide member 33 which has depending sides 34 which extend downwardly and at the bottom where they are close to the liquid level and on the outer faces they are provided with curved means which coact with the curved surfaces of fixed means 35 in such a way that the gas picks up a sheet of the liquid as it passes between the curved faces and throws the sheet in such a way that it very intimately contacts it, thereby effecting removal of nearly all of the carbon black (say 96 per cent) and formation of a carbon black slurrry in the bottom of chamber 31. The resulting mixture of gas and liquid is thrown violently into the liquid between member 33 and the right and left walls of chamber 33, in the manner indicated in the drawing. The gas separates from the liquid and passes upwardly through baffles 36 which serve to knock out entrained liquid. If desired water, containing a wetting agent or not and having a little carbon black dispersed therein or not as desired, may be sprayed onto the upper faces of baffles 36 by means of pipe 37 if desired to remove any remaining carbon black in suspension in the gas. A fan 38 may be employed, if desired, to pull the gas through out of the unit and reduce the pressure therein.

Fresh aqueous medium is continuously introduced via line 39 and finished slurry of the desired concentration is continuously withdrawn via line 40 at a corresponding rate such as to maintain the volume and level of the liquid in unit 31 constant. It will be obvious that if desired floatcontrolled means may be provided for holding the liquid level in the bottom of unit 31 constant and at the proper point with respect to the curved surfaces which form the curtain of liquid. The liquid may be any of those disclosed in detail herein and the foregoing disclosure is applicable to Fig. 2 equally as to Fig. 1.

I claim:

1. The process of recovering carbon black from suspension in a gas which comprises intimately scrubbing said gas containing carbon black in suspension with an aqueous liquid medium containing an added wetting agent and thereby causing the carbon black particles to leave said gas and become suspended in said aqueous liquid medium and form a liquid aqueous carbon black slurry, withdrawing the resulting liquid slurry from the scrubbing zone, splitting the withdrawn slurry into two streams, recycling one of said streams to said scrubbing step without the removal of the major portion of the carbon black from said slurry to cause the concentration of carbon black in the recycled slurry to attain a level of from 10 to 25 per cent by weight, and withdrawing the other of said streams from the system as the product of the process.

2. The process of claim 1 wherein said aqueous medium is rubber latex.

3. The process of claim 1 wherein said aqueous medium consists essentially of water.

4. The continuous process of making furnace carbon black which is difficultly wettable with water and recovering same in the form of an aqueous slurry which comprises subjecting a hydrocarbon fluid to incomplete combustion under such conditions as to produce a gaseous effluent containing solid particles of carbon black in suspension, quenching the resulting hot gaseous effluent with water, passing the resulting effluent upwardly in a vertical scrubbing zone and in intimate countercurrent contact with an aqueous liquid medium containing an added wetting agent, introducing a fresh supply of said aqueous medium containing said added wetting agent into the top of said scrubbing zone, causing said carbon black particles to leave said effluent and become suspended in said aqueous liquid medium and form a liquid aqueous carbon black slurrry, withdrawing the resulting liquid slurry from the bottom of said zone, splitting the withdrawn slurry into a relatively large stream and a relatively small stream, recycling the relatively large stream without the removal of the major portion of the carbon black from said slurrry and introducing a major portion thereof into said scrubbing zone at a point intermediate the points of introduction of said fresh aqueous medium containing said added wetting agent and said resulting effluent and a minor proportion thereof into admixture with said fresh aqueous liquid containing said added wetting agent prior to introduction thereof into said zone whereby the difficulty of wetting of said carbon black with water is overcome, and withdrawing said relatively small stream from the system as the product of the process.

5. The process of claim 4 wherein said aqueous medium is rubber latex.

6. The process of claim 4 wherein said aqueous medium consists essentially of water.

7. The continuous process of making furnace carbon black which is difficultly wettable with water and recovering same in the form of a slurry in rubber latex which comprises subjecting a hydrocarbon fluid to incomplete combustion under such conditions as to produce a gaseous effluent containing solid particles of carbon black in suspension, quenching the resulting hot gaseous effluent with water to a temperature of from 300 to 600° F., passing the resulting effluent into the bottom of a vertical scrubbing zone, injecting liquid water into said effluent just before it enters said zone, injecting liquid water into said zone at a point adjacent but substantially above the point at which said effluent enters same and causing same to descend in intimate countercurrent contact with said effluent, carrying out secondary quenching of said effluent with said water in the lower portion of said zone, introducing rubber latex into the top of said zone and causing same to descend therein in intimate countercurrent contact with said effluent, causing the carbon particles to leave said effluent and become suspended in said water and said latex and form a liquid slurry and withdrawing the resulting liquid slurry of carbon black in latex from the bottom of said zone, said slurry embodying the latex and the water injected into said zone.

8. The process of claim 7 including the further steps of splitting the withdrawn slurry into two streams, one relatively large and one relatively small, recycling said relatively large stream without the removal of the major portion of the carbon black from said slurry and introducing same into the upper portion of said scrubbing zone and withdrawing said relatively small stream as the product of the process.

9. The process of claim 7 including the further steps of splitting the withdrawn slurry into two streams, one relatively large and one relatively small, recycling said relatively large stream without the removal of the major portion of the carbon black from said slurry to said scrubbing zone, admixing a relatively small portion thereof with the latex introduced to the top of said scrubbing zone and introducing a relatively large portion thereof into said scrubbing zone at a point adjacent but substantially below the top thereof, and withdrawing said relatively small slurry stream as the product of the process, said last-named stream corresponding in amount to the amounts of water and latex fed to said scrubbing zone.

10. The process of recovering carbon black from suspension in a gas which comprises intimately scrubbing said gas containing carbon black in suspension in an aqueous liquid medium containing a minor but effective amount of a wetting agent comprising an alkali metal alkylaryl sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry two attain a level of from 10 to 25 per cent by weight, and withdrawing the other stream of slurry from the system as the product of the process.

11. The process of recovering carbon black from suspension in a gas which comprises intimately scrubbing said gas containing carbon black in suspension in an aqueous liquid medium containing 1 to 5 per cent of a wetting agent based on the weight of the carbon black comprising an alkali metal alkylaryl sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

12. The process of recovering carbon black from suspension in a gas which comprises intimately scrubbing said gas containing carbon black in suspension in an aqueous liquid medium containing a minor but effective amount of a wetting agent comprising an alkali metal alkylbenzene sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

13. The process of recovering carbon black from suspension in a gas which comprises intimately scrubbing said gas containing carbon black in suspension in an aqueous liquid medium containing 1 to 5 per cent of a wetting agent based on the weight of the carbon black comprising an alkali metal alkylbenzene sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

14. The process of recovering carbon black from suspension in a gas which comprises intimately scrubbing said gas containing carbon black in suspension in an aqueous liquid medium containing a minor but effective amount of a wetting agent comprising an alkali metal alkylnaphthalene sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

15. The process of recovering carbon black from suspension in a gas which comprises intimately scrubbing said gas containing carbon black in suspension in an aqueous liquid medium containing 1 to 5 per cent of a wetting agent based on the weight of the carbon black comprising an alkali metal alkylnaphthalene sulfonate to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

16. The process of recovering carbon black from suspension in a gas which comprises intimately scrubbing said gas containing carbon black in suspension in an aqueous liquid medium containing a minor but effective amount of a wetting agent comprising a polymerized sodium salt of isopropylnaphthalene sulfonic acid to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

17. The process of recovering carbon black from suspension in a gas which comprises intimately scrubbing said gas containing carbon black in suspension in an aqueous liquid medium containing 1 to 5 per cent of a wetting agent based on the weight of the carbon black comprising a polymerized sodium salt of isopropylnaphthalene sulfonic acid to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

18. The process of recovering carbon black from suspension in a gas which comprises intimately scrubbing said gas containing carbon black in suspension in an aqueous liquid medium containing a minor but effective amount of a wetting agent comprising an alkyl polyether alcohol to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

19. The process of recovering carbon black from suspension in a gas which comprises intimately scrubbing said gas containing carbon black in suspension in an aqueous liquid medium containing 1 to 5 per cent of a wetting agent based on the weight of the carbon black comprising an alkyl polyether alcohol to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

20. The process of recovering carbon black from suspension in a gas which comprises intimately scrubbing said gas containing carbon black in suspension in an aqueous liquid medium containing a minor but effective amount of a wetting agent comprising a water soluble alkali metal salt of a long chain fatty acid to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

21. The process of recovering carbon black from suspension in a gas which comprises intimately scrubbing said gas containing carbon black in suspension in an aqueous liquid medium containing 1 to 5 per cent of a wetting agent based on the weight of the carbon black comprising a water soluble alkali metal salt of a long chain fatty acid to form an aqueous carbon black slurry, withdrawing the slurry from the scrubbing zone, splitting the withdrawn slurry into two streams, recycling one of said streams to said scrubbing step to cause the concentration of carbon black in the withdrawn slurry to attain a level of from 10 to 25 per cent by weight, and withdrawing the other stream of slurry from the system as the product of the process.

22. The continuous process of making furnace carbon black which is difficultly wettable with water and recovering same in the form of an aqueous slurry which comprises subjecting a hydrocarbon fluid to incomplete combustion under such conditions as to produce a gaseous effluent containing solid particles of carbon black in suspension, quenching the resulting hot gaseous effluent with water, passing resulting effluent upwardly in a vertical scrubbing zone and in intimate countercurrent contact with an aqueous liquid medium, introducing a fresh supply of said aqueous medium into the top of said scrubbing zone, causing said carbon black particles to leave said effluent and become suspended in said aqueous liquid medium and form a liquid aqueous carbon black slurry, withdrawing the resulting liquid slurry from the bottom of said zone, splitting the withdrawn slurry into a relatively large stream and a relatively small stream, recycling the relatively large stream without the removal of the major portion of the carbon black from said slurry and introducing a major portion thereof into said scrubbing zone at a point intermediate the points of introduction of said fresh aqueous medium containing said added wetting agent and said resulting effluent and a minor proportion thereof into admixture with said fresh aqueous liquid prior to introduction thereof into said zone whereby the difficulty of wetting of said carbon black with water is overcome, and withdrawing said relatively small stream from the system as the product of the process.

23. The process of claim 22 wherein said aqueous medium is rubber latex.

24. The process of claim 22 wherein said aqueous medium consists essentially of water.

MYRON O. KILPATRICK.

REFERENCES CITED

The following references are of record in the file of this patent:

UNITED STATES PATENTS

| Number | Name | Date |
|---|---|---|
| 1,707,775 | Uhlinger | Apr. 2, 1929 |
| 1,767,089 | Miller et al. | Jan. 24, 1930 |
| 1,765,991 | Miller | June 24, 1930 |
| 1,801,436 | Lewis | Apr. 21, 1931 |
| 1,902,746 | Yunker | Mar. 21, 1933 |
| 2,121,535 | Amon | June 21, 1938 |
| 2,123,482 | De Jong | July 12, 1938 |
| 2,163,630 | Reed | June 27, 1939 |
| 2,254,572 | Harlow | Sept. 2, 1941 |
| 2,288,087 | Hanson et al. | June 30, 1942 |
| 2,289,672 | Merrill | July 14, 1942 |
| 2,306,698 | Heller | Dec. 29, 1942 |
| 2,368,828 | Hanson | Feb. 6, 1945 |

FOREIGN PATENTS

| Number | Country | Date |
|---|---|---|
| 114,040 | Great Britain | Mar. 21, 1918 |
| 429,088 | Great Britain | May 23, 1935 |

OTHER REFERENCES

Lenher, Chemical Industries, March 1941, pages 324–326.